(12) United States Patent
Ando et al.

(10) Patent No.: US 9,014,889 B2
(45) Date of Patent: Apr. 21, 2015

(54) HYBRID VEHICLE AND METHOD OF CONTROLLING HYBRID VEHICLE

(75) Inventors: Yasushi Ando, Nagoya (JP); Shigeo Okubo, Anjo (JP); Daichi Yagi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 275 days.

(21) Appl. No.: 13/565,984

(22) Filed: Aug. 3, 2012

(65) Prior Publication Data
US 2013/0035815 A1 Feb. 7, 2013

(30) Foreign Application Priority Data
Aug. 3, 2011 (JP) ................................ 2011-169969

(51) Int. Cl.
| | |
|---|---|
| B60K 1/00 | (2006.01) |
| B60K 6/20 | (2007.10) |
| B60W 10/06 | (2006.01) |
| B60L 9/00 | (2006.01) |
| G05D 3/00 | (2006.01) |
| B60K 6/445 | (2007.10) |
| B60W 20/00 | (2006.01) |
| B60W 30/18 | (2012.01) |
| B60L 3/00 | (2006.01) |
| B60L 3/04 | (2006.01) |
| B60L 3/12 | (2006.01) |
| B60L 11/12 | (2006.01) |

(Continued)

(52) U.S. Cl.
CPC ............... *B60K 6/445* (2013.01); *B60W 20/00* (2013.01); *B60W 30/18054* (2013.01); *B60L 3/0038* (2013.01); *B60L 3/04* (2013.01); *B60L 3/12* (2013.01); *B60L 11/126* (2013.01); *B60L 11/14* (2013.01); *B60L 11/1816* (2013.01); *B60L 11/1861* (2013.01); *B60L 15/2045* (2013.01); *B60W 10/08* (2013.01); *Y02T 10/6239* (2013.01); *Y02T 10/6269* (2013.01); *B60L 2240/36* (2013.01); *B60L 2240/421* (2013.01); *B60L 2240/423* (2013.01); *B60L 2240/445* (2013.01); *B60L 2240/461* (2013.01); *B60L 2240/545* (2013.01); *B60L 2240/547* (2013.01); *B60L 2240/549* (2013.01); *B60L 2240/80* (2013.01); *B60L 2250/10* (2013.01); *B60L 2260/26* (2013.01); *Y10S 903/903* (2013.01); *Y10S 903/904* (2013.01)

(58) Field of Classification Search
None
See application file for complete search history.

(56) References Cited

U.S. PATENT DOCUMENTS

| | | | |
|---|---|---|---|
| 5,289,809 A | * | 3/1994 | Kamiya et al. ............... 123/491 |
| 7,360,415 B2 | * | 4/2008 | Nakano et al. ............ 73/204.26 |

(Continued)

FOREIGN PATENT DOCUMENTS

| | | |
|---|---|---|
| JP | 6033814 A | 2/1994 |
| JP | 2005-220816 A | 8/2005 |

(Continued)

*Primary Examiner* — Yonel Beaulieu
*Assistant Examiner* — Krishnan Ramesh
(74) *Attorney, Agent, or Firm* — Gifford, Krass, Sprinkle, Anderson & Citkowski, P.C.

(57) ABSTRACT

A hybrid vehicle includes an internal combustion engine; a rotating electrical machine that rotates an output shaft of the internal combustion engine; and a control unit that performs automatic stop control for the internal combustion engine. The control unit causes the output shaft to rotate using the rotating electrical machine, when a stop period of the internal combustion engine according to the automatic stop control is equal to or longer than a first period.

14 Claims, 6 Drawing Sheets

(51) Int. Cl.
  *B60L 11/14* (2006.01)
  *B60L 11/18* (2006.01)
  *B60L 15/20* (2006.01)
  *B60W 10/08* (2006.01)

(56) References Cited

U.S. PATENT DOCUMENTS

| | | | |
|---|---|---|---|
| 2006/0037390 A1* | 2/2006 | Nakano et al. | 73/204.21 |
| 2008/0093863 A1* | 4/2008 | Roh | 290/38 R |
| 2008/0202223 A1* | 8/2008 | Tsujimura et al. | 73/114.31 |
| 2009/0138154 A1* | 5/2009 | Mc Lain et al. | 701/34 |
| 2010/0113213 A1* | 5/2010 | Oba et al. | 477/5 |
| 2010/0174459 A1* | 7/2010 | Gibson et al. | 701/54 |
| 2010/0269802 A1* | 10/2010 | Nakashima et al. | 123/568.21 |
| 2012/0160024 A1* | 6/2012 | Matsumoto et al. | 73/204.11 |
| 2014/0044149 A1* | 2/2014 | Matsuura | 374/145 |

FOREIGN PATENT DOCUMENTS

| | | |
|---|---|---|
| JP | 2006-161565 A | 6/2006 |
| JP | 2006226214 A | 8/2006 |
| JP | 2007-056787 A | 3/2007 |
| JP | 2007-216764 A | 8/2007 |
| JP | 2010-116861 A | 5/2010 |
| JP | 2010-184651 A | 8/2010 |
| JP | 2010-242724 A | 10/2010 |

* cited by examiner

HYBRID VEHICLE AND METHOD OF CONTROLLING HYBRID VEHICLE

CROSS REFERENCE TO RELATED APPLICATIONS

This application claims priority to Japanese Patent Application No. 2011-169969 filed on Aug. 3, 2011, which is incorporated herein by reference in its entirety including the specification, drawings and abstract.

BACKGROUND OF THE INVENTION

1. Field of the Invention

The invention relates to the control of a hybrid vehicle in which automatic stop control of an internal combustion engine is performed.

2. Description of Related Art

In a hybrid vehicle, automatic stop control of an internal combustion engine is performed on the basis of a state of the vehicle. In Japanese Patent Application Publication No. 2010-116861 (JP-2010-116861 A), there is described an art of accurately estimating the temperature of a catalyst in a vehicle in which automatic stop control of an internal combustion engine is performed.

While the internal combustion engine has been stopped due to the performance of automatic stop control, the temperature in an intake passage of the internal combustion engine may rise. Especially in the case where a hot wire airflow meter is provided in the intake passage, the temperature around the intake air temperature sensor may rise during the stop of the internal combustion engine. Thus, when the internal combustion engine is restarted, a difference may arise between a detection value of the intake air temperature sensor and an actual intake air temperature. As a result, the control accuracy in performing control of the internal combustion engine (e.g., fuel injection control) based on the detection value of the intake air temperature sensor may deteriorate.

SUMMARY OF THE INVENTION

The invention provides a hybrid vehicle and a method of controlling the hybrid vehicle, in which the accuracy in controlling an internal combustion engine is restrained from deteriorating at the time of restart of the internal combustion engine.

A first aspect of the invention relates to a hybrid vehicle including an internal combustion engine; a rotating electrical machine that rotates an output shaft of the internal combustion engine; and a control unit that performs automatic stop control for the internal combustion engine. The control unit causes the output shaft to rotate using the rotating electrical machine, when a stop period of the internal combustion engine according to the automatic stop control is equal to or longer than a first period.

The hybrid vehicle according to the above-described aspect may further include an intake air temperature detection unit that is provided in an intake passage of the internal combustion engine, wherein the control unit may determine the first period in association with a detection value detected by the intake air temperature detection unit.

The control unit may determine the first period in a manner such that when a degree of rise in the detection value is large, the first period is shorter than when the degree of rise in the detection value is small.

The control unit may determine the first period in a manner such that when the detection value is high, the first period is shorter than when the detection value is low.

The control unit may determine the first period in a manner such that when a temperature of a cooling medium for the internal combustion engine is high, the first period is shorter than when the temperature of the cooling medium for the internal combustion engine is low.

The control unit may perform fuel injection control on the basis of a temperature of a cooling medium for the internal combustion engine at a time of restart of the internal combustion engine, when the output shaft is not able to be caused to rotate using the rotating electrical machine.

The hybrid vehicle according to the above-described aspect may further include an electric storage device that supplies an electric power to the rotating electrical machine, wherein the control unit may regard a case where a remaining capacity of the electric storage device is smaller than a threshold as a case where the output shaft is not able to be caused to rotate using the rotating electrical machine, and may perform the fuel injection control on the basis of the temperature of the cooling medium at the time of the restart.

The control unit may regard a case where a shift position is a parking position as a case where the output shaft is not able to be caused to rotate using the rotating electrical machine, and may perform the fuel injection control on the basis of the temperature of the cooling medium at the time of the restart.

The hybrid vehicle according to the above-described aspect may further include an intake air temperature detection unit that is provided in an intake passage of the internal combustion engine, wherein the control unit may refrain from detecting a failure in the intake air temperature detection unit when the fuel injection control is performed on the basis of the temperature of the cooling medium for the internal combustion engine at the time of the restart.

The hybrid vehicle according to the above-described aspect may further include an intake air temperature detection unit that is provided in an intake passage of the internal combustion engine, wherein the control unit may perform the fuel injection control on the basis of a detection value detected by the intake air temperature detection unit at the time of the restart, when the output shaft is able to be caused to rotate using the electrical rotating machine.

The hybrid vehicle according the above-described aspect may further include an intake air temperature detection unit that is provided in an intake passage of the internal combustion engine, and a hot wire airflow meter that is provided in the intake passage of the internal combustion engine, and that detects a flow rate of air in the intake passage, wherein: the hot wire airflow meter may be held energized while the internal combustion engine has been stopped through the automatic stop control; and the control unit may cause the output shaft to rotate using the rotating electrical machine so that air in the intake passage flows, when the stop period of the internal combustion engine according to the automatic stop control is equal to or longer than the first period.

A second aspect of the invention relates to a method of controlling a hybrid vehicle including an internal combustion engine and a rotating electrical machine that rotates an output shaft of the internal combustion engine. The method includes performing automatic stop control of the internal combustion engine; and causing the output shaft to rotate using the rotating electrical machine when a stop period for the internal combustion engine according to the automatic stop control is equal to or longer than a first period.

According to the foregoing aspects of the invention, air in the intake passage of the internal combustion engine is caused to flow, by causing the output shaft of the internal combustion engine to rotate using the rotating electrical machine when the stop period of the internal combustion engine according to automatic stop control is equal to or longer than the threshold. Thus, air is restrained from stagnating around the intake air temperature sensor. That is, the temperature around the intake air temperature sensor is restrained from rising. As a result, the discrepancy between the detection value of the intake air temperature sensor and the actual intake air temperature is restrained from being increased when the internal combustion engine is restarted. Accordingly, it is possible to provide a hybrid vehicle and a method of controlling the hybrid vehicle, in which the accuracy in controlling an internal combustion engine is restrained from deteriorating at the time of restart of the internal combustion engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the drawings. In the following description, like components are denoted by like reference symbols respectively. Those components denoted by the same reference symbol are identical in name and function. Accordingly, the detailed description of those components will not be repeated.

Figure 1:
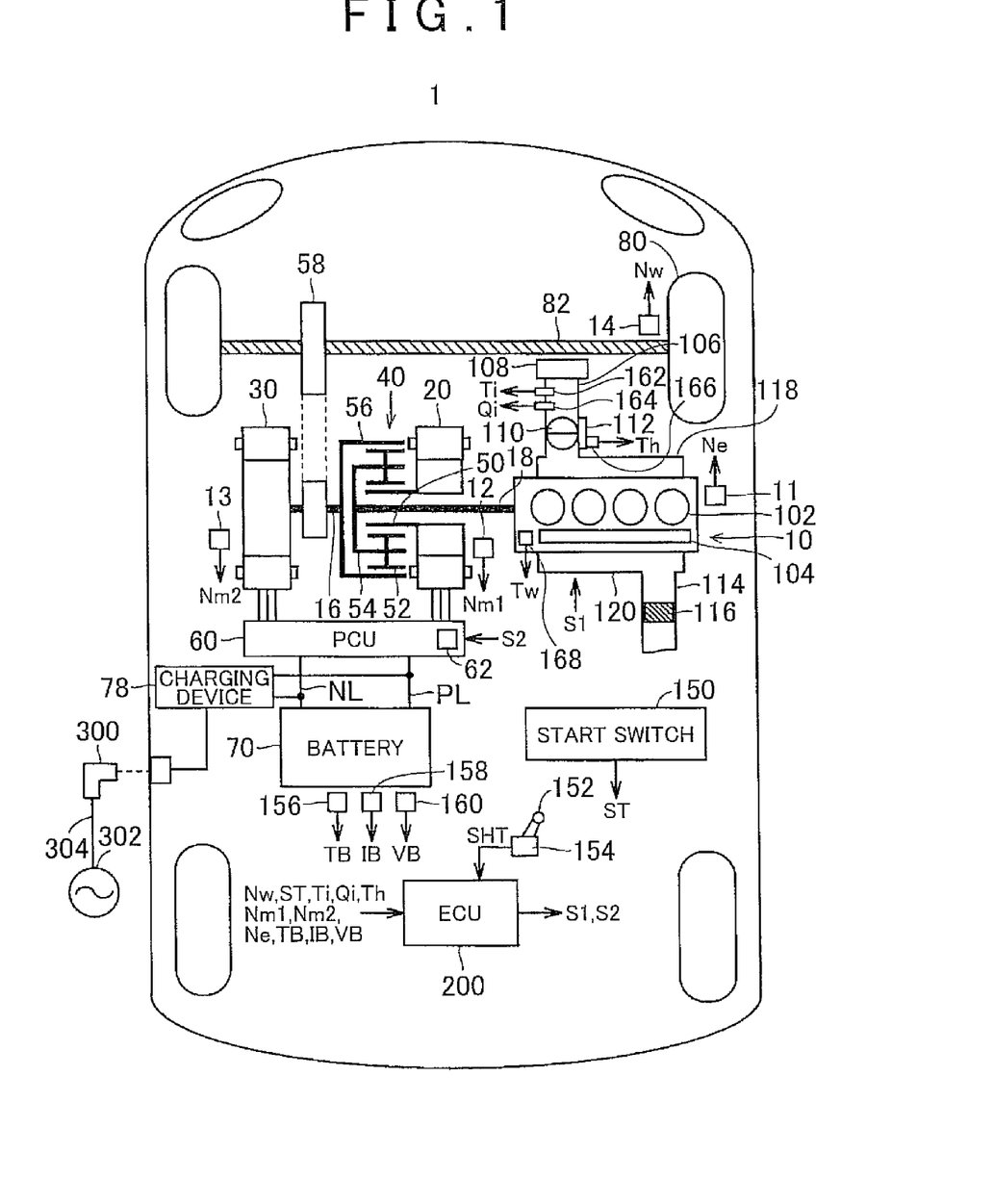
FIG. 1 is an overall block diagram of a hybrid vehicle according to an embodiment of the invention.

Referring to FIG. 1, an overall block diagram of a hybrid vehicle 1 (which will be referred to simply as the vehicle 1 in the following description) according to one of the embodiments of the invention will be described. The vehicle 1 includes an engine 10, a drive shaft 16, a first motor-generator (which will be referred to hereinafter as a first MG) 20, a second motor-generator (which will be referred to hereinafter as a second MG) 30, a power split device 40, a reducer 58, a power control unit (a PCU) 60, a battery 70, a charging device 78, driving wheels 80, a start switch 150, a shift lever 152, and an electronic control unit (an ECU) 200.

This vehicle 1 runs by a driving force that is output from at least one of the engine 10 and the second MG 30. A power generated by the engine 10 is split into powers transmitted through two paths, by the power split device 40. In one of the two paths, the power is transmitted to the driving wheels 80 via the reducer 58. In the other path, the power is transmitted to the first MG 20.

The first MG 20 and the second MG 30 are, for example, three-phase alternating current rotating electrical machines. The first MG 20 and the second MG 30 are driven by the PCU 60.

The first MG 20 functions as a generator that generates an electric power through the use of the power of the engine 10 split by the power split device 40 to charge the battery 70 via the PCU 60. Further, the first MG 20 rotates an output shaft 18 (a crankshaft) of the engine 10 upon receiving an electric power from the battery 70. Thus, the first MG 20 functions as a starter that starts the engine 10.

The second MG 30 functions as a drive motor that imparts a driving force to the driving wheels 80 through the use of at least one of an electric power stored in the battery 70 and an electric power generated by the first MG 20. Further, the second MG 30 functions as a generator for charging the battery 70 via the PCU 60 through the use of an electric power generated by regenerative braking.

The engine 10 is, for example, an internal combustion engine such as a gasoline engine, a diesel engine, or the like. The engine 10 includes a plurality of cylinders 102, a fuel injection device 104 that supplies fuel to the plurality of the cylinders 102 respectively, an intake passage 106, an air cleaner 108, a throttle valve 110, a throttle motor 112, an exhaust passage 114, a three-way catalyst converter 116, an intake manifold 118, and an exhaust manifold 120. It should be noted that the number of the cylinders 102 of the engine 10 may be equal to or larger than one.

The fuel injection device 104 injects suitable amounts of fuel to the cylinders at suitable timings respectively, and stops injecting fuel into the respective cylinders, on the basis of a control signal S1 from the ECU 200. The amount of fuel injected by the fuel injection device 104 is adjusted by adjusting the time of injection.

One end of the intake passage 106 is connected to the air cleaner 108. The other end of the intake passage 106 is connected to the intake manifold 118 of the engine 10. A throttle valve 110 for adjusting the flow rate of air in the intake passage 106 is provided in the intake passage 106. The opening degree of the throttle valve 110 (which will be referred to as a throttle opening degree in the following description) is adjusted by a throttle motor 112. The throttle motor 112 operates on the basis of the control signal S1 from the ECU 200.

An intake air temperature sensor 162 and an airflow meter 164 are provided in the intake passage 106 at a position upstream of the throttle valve 110.

The intake air temperature sensor 162 is an intake air temperature detection unit provided in the intake passage 106. The intake air temperature sensor 162 detects a temperature of air in the intake passage 106 (which will be referred to as an intake air temperature in the following description) Ti. The intake air temperature sensor 162 transmits to the ECU 200 a signal indicating the detected intake air temperature Ti.

The airflow meter 164 detects a flow rate of air in the intake passage 106 (which will be referred to as an intake air amount in the following description) Qi. The airflow meter 164 is a heat wire airflow meter. The airflow meter 164 transmits to the ECU 200 a signal indicating the detected intake air amount Qi. The hot wire airflow meter detects the intake air amount Qi on the basis of an amount of change in a current value of a hot wire. The resistance of the hot wire changes when heat is removed from the hot wire while air passes through the hot wire.

Further, the throttle motor 112 is provided with a throttle position sensor 166. The throttle position sensor 166 detects a throttle opening degree Th. The throttle position sensor 166 transmits to the ECU 200 a signal indicating the detected throttle opening degree Th.

In addition, the engine 10 is provided with a coolant temperature sensor 168. The coolant temperature sensor 168 detects a temperature of a cooling medium flowing through the engine 10 (which will be referred to as a coolant temperature in the following description) Tw. The coolant temperature sensor 168 transmits to the ECU 200 a signal indicating the detected coolant temperature Tw.

One end of the exhaust passage 114 is connected to the exhaust manifold 120. Further, the other end of the exhaust passage 114 is connected to a muffler (not shown). The three-way catalyst converter 116 is provided in the exhaust passage 114.

In addition, the engine 10 is provided with an engine rotational speed sensor 11. The engine rotational speed sensor 11 detects a rotational speed of the output shaft (crankshaft) 18 of the engine 10 (which will be referred to hereinafter as an engine rotational speed) Ne. The engine rotational speed sensor 11 transmits to the ECU 200 a signal indicating the detected engine rotational speed Ne.

The power split device 40 mechanically couples three elements, namely, the drive shaft 16 for causing the driving wheels 80 to rotate, the output shaft 18 of the engine 10, and a rotary shaft of the first MG 20 to one another. By using one of the aforementioned three elements as a reactive force element, the power split device 40 allows a power to be transmitted between the other two elements. A rotary shaft of the second MG 30 is coupled to the drive shaft 16.

The power split device 40 is a planetary gear mechanism that includes a sun gear 50, a pinion gear 52, a carrier 54, and a ring gear 56. The pinion gear 52 meshes with each of the sun gear 50 and the ring gear 56. The carrier 54 supports the pinion gear 52 such that the pinion gear 52 rotates around its own axis, and is coupled to the output shaft 18 of the engine 10. The sun gear 50 is coupled to the rotary shaft of the first MG 20. The ring gear 56 is coupled to the rotary shaft of the second MG 30 and the reducer 58 via the drive shaft 16.

The reducer 58 transmits to the driving wheels 80 a power from the power split device 40 or the second MG 30. Further, the reducer 58 transmits to the power split device 40 or the second MG 30 a reactive force that is received by the driving wheels 80 from a road surface.

The PCU 60 includes a plurality of switching elements 62. The PCU 60 converts a direct-current electric power stored in the battery 70 into an alternating-current electric power for driving the first MG 20 and the second MG 30, by controlling the operation of turning on/off the switching elements 62. The PCU 60 includes a converter (not shown) and an inverter (not shown) that are controlled on the basis of a control signal S2 from the ECU 200. The converter steps up a voltage of the direct-current electric power received from the battery 70, and outputs the voltage thus steeped up to the inverter. The inverter converts a direct-current electric power output by the converter into an alternating-current electric power, and outputs the alternating-current electric power to the first MG 20 and/or the second MG 30. Thus, the first MG 20 and/or the second MG 30 are/is driven, using the electric power stored in the battery 70. Further, the inverter converts an alternating-current electric power generated by the first MG 20 and/or the second MG 30 into a direct-current electric power, and outputs the direct-current electric power to the converter. The converter steps down a voltage of the direct-current electric power output by the inverter, and outputs the voltage thus stepped down to the battery 70. Thus, the battery 70 is charged, using the electric power generated by the first MG 20 and/or the second MG 30. It should be noted that the converter may be omitted.

The battery 70 is an electric storage device, and is a rechargeable direct-current power supply. For example, a secondary battery such as a nickel hydride battery, a lithium-ion battery, or the like is employed as the battery 70. The voltage of the battery 70 is, for example, about 200 V. The battery 70 may be charged using an electric power supplied from an external power supply (not shown), instead of being charged using the electric power generated by the first MG 20 and/or the second MG 30 as described above. It should be noted that the battery 70 is not limited to a secondary battery, but may be a battery capable of generating a direct-current voltage, for example, a capacitor, a solar battery, a fuel cell, or the like.

The battery 70 is not only charged using the electric power generated by the first MG 20 and/or the second MG 30 as described above, but is also charged by the charging device 78 using an electric power supplied from an external power supply 302.

The battery 70 is provided with a battery temperature sensor 156, a current sensor 158, and a voltage sensor 160.

The battery temperature sensor 156 detects a battery temperature TB of the battery 70. The battery temperature sensor 156 transmits to the ECU 200 a signal indicating the battery temperature TB.

The current sensor 158 detects a current IB of the battery 70. The current sensor 158 transmits to the ECU 200 a signal indicating the current IB.

The voltage sensor 160 detects a voltage VB of the battery 70. The voltage sensor 160 transmits to the ECU 200 a signal indicating the voltage VB.

The ECU 200 estimates a remaining capacity of the battery 70 (which will be referred to as a state of charge (an SOC) in the following description) on the basis of the current IB of the battery 70, the voltage VB of the battery 70, and the battery temperature TB of the battery 70. For example, the ECU 200 may estimate an open circuit voltage (an OCV) on the basis of the current IB, the voltage VB, and the battery temperature TB, and may estimate an SOC of the battery 70 on the basis of the estimated OCV and a predetermined map. Alternatively, for example, the ECU 200 may estimate an SOC of the battery 70 by integrating a charge current of the battery 70 and a discharge current of the battery 70.

The shift lever 152 is an operation member for allowing a driver to select one of a plurality of shift positions. The plurality of the shift positions include, for example, a parking position (which will be referred to hereinafter as a P position), a neutral position, a forward running position, and a backward running position. The shift lever 152 is, for example, a shift lever of a momentary type. It should be noted that a parking position switch for selecting the P position may be provided separately from the shift lever 152.

The shift lever 152 is provided with a shift position sensor 154 for detecting a position of the shift lever 152. The shift position sensor 154 transmits to the ECU 200 a signal SHT indicating the position of the shift lever 152. The ECU 200 determines, on the basis of the signal SHT received from the shift position sensor 154, which one of the plurality of the shift positions has been selected.

For example, when the driver moves the position of the shift lever 152 to a position corresponding to the forward running position while the P position has been selected, the ECU 200 cancels the P position, and selects the forward running position. Further, when the driver moves the position of the shift lever 152 to a position corresponding to the backward running position while the forward running position has been selected, the ECU 200 selects the backward running position. It should be noted that the ECU 200 may select the P position, for example, when the parking position switch is operated while the forward running position has been selected.

The start switch 150 is, for example, a push-type switch. The start switch 150 may be designed such that a key is inserted into a key cylinder and turned to a predetermined position. The start switch 150 is connected to the ECU 200. In response to the operation of the start switch 150 by the driver, the start switch 150 transmits a signal ST to the ECU 200.

The first MG 20 is provided with a first resolver 12. The first resolver 12 detects a rotational speed Nm1 of the first MG 20. The first resolver 12 transmits to the ECU 200 a signal indicating the detected rotational speed Nm1.

The second MG 30 is provided with a second resolver 13. The second resolver 13 detects a rotational speed Nm2 of the second MG 30. The second resolver 13 transmits to the ECU 200 a signal indicating the detected rotational speed Nm2.

A drive shaft 82, which couples the reducer 58 to the driving wheels 80, is provided with a wheel speed sensor 14. The wheel speed sensor 14 detects a rotational speed Nw of the driving wheels 80. The wheel speed sensor 14 transmits to the ECU 200 a signal indicating the detected rotational speed Nw. The ECU 200 calculates a vehicle speed V on the basis of the received rotational speed Nw. It should be noted that the ECU 200 may calculate the vehicle speed V on the basis of the rotational speed Nm2 of the second MG 30 instead of calculating the vehicle speed V on the basis of the rotational speed Nw.

The charging device 78 charges the battery 70 using an electric power that is supplied from the external power supply 302 through the attachment of a charging plug 300 to the vehicle 1. The charging plug 300 is connected to one end of a charging cable 304. The other end of the charging cable 304 is connected to the external power supply 302. A positive electrode terminal of the charging device 78 is connected to a power supply line PL that connects a positive electrode terminal of the PCU 60 and a positive electrode terminal of the battery 70 to each other. A negative electrode terminal of the charging device 78 is connected to an earth line NL that connects a negative electrode terminal of the PCU 60 and a negative electrode terminal of the battery 70 to each other.

The ECU 200 generates the control signal S1 for controlling the engine 10, and outputs the generated control signal S1 to the engine 10. Further, the ECU 200 generates the control signal S2 for controlling the PCU 60, and outputs the generated control signal S2 to the PCU 60.

The ECU 200 controls an entire hybrid system, namely, the charge/discharge state of the battery 70 and the operation states of the engine 10, the first MG 20, and the second MG 30 such that the vehicle 1 can be driven most efficiently, by controlling the engine 10, the PCU 60, and the like.

The ECU 200 calculates a required driving force corresponding to a depression amount of an accelerator pedal (not shown) that is provided in a driver seat. The ECU 200 controls the torque of the first MG 20, the torque of the second MG 30, and the output of the engine 10 in accordance with the required driving force thus calculated.

In the case where the efficiency of the engine 10 is low when the vehicle 1 configured as described above starts moving, runs at low speed, etc., the vehicle 1 runs only by the second MG 30. Further, during normal running, the power of the engine 10 is split into powers transmitted through two paths respectively by, for example, the power split device 40. The driving wheels 80 are directly driven by one of the powers. The first MG 20 is driven by the other power, so that an electric power is generated. At this time, the ECU 200 drives the second MG 30 using the generated electric power. The driving of the driving wheels 80 is assisted by thus driving the second MG 30.

When the vehicle 1 decelerates, the second MG 30, which is driven through the rotation of the driving wheels 80, functions as a generator to carry out regenerative braking. The electric power recovered through regenerative braking is stored into the battery 70. It should be noted that when the battery 70 needs to be charged in particular due to a decrease in the SOC of the battery 70, the output of the engine 10 is increased to increase the amount of electric power generated by the first MG 20. Thus, the SOC of the battery 70 is increased. Further, in some cases, the ECU 200 performs the control of increasing the driving force from the engine 10 according to need even when the vehicle 1 runs at low speed. Such cases include, for example, a case where the battery 70 needs to be charged as described above, a case where an auxiliary such as an air conditioner or the like is driven, a case where the temperature of coolant for the engine 10 is raised to a predetermined temperature, and the like.

Furthermore, in the vehicle 1 as shown in FIG. 1, the ECU 200 performs automatic stop control for the engine 10. The ECU 200 automatically stops the engine 10 to improve fuel efficiency when the vehicle 1 is in a certain driving state or the battery 70 is in a certain state. Then, the ECU 200 restarts the engine 10 when the vehicle 1 is in a certain driving state or the battery 70 is in a certain state even after the engine 10 is stopped.

More specifically, the ECU 200 permits automatic stop control for the engine 10 to be performed when an automatic stop permission condition regarding the state of the vehicle 1 is fulfilled. The ECU 200 prohibits automatic stop control from being performed when the automatic stop permission condition is not fulfilled.

The automatic stop permission condition includes, for example, at least one of a condition regarding the battery temperature TB of the battery 70, a condition regarding the SOC of the battery 70, a condition regarding the presence/absence of a deterioration in the battery 70, a condition regarding the temperature of the cooling medium for the engine 10 (which will be referred to hereinafter as a coolant temperature) Tw, a condition regarding the temperature of the three-way catalyst converter 116 of the engine 10, a condition regarding the speed of the vehicle 1, and a condition regarding the presence/absence of a request to operate the air conditioner.

The condition of the battery temperature TB of the battery 70 is, for example, a condition that the battery temperature TB is higher than a threshold TB(0). The condition regarding the SOC of the battery 70 is, for example, a condition that the SOC is larger than a threshold SOC(0). The condition regarding the coolant temperature of the engine 10 is, for example, a condition that the coolant temperature Tw is higher than a threshold Tw(0) and thus warm-up is completed.

The condition regarding the temperature of the three-way catalyst converter 116 of the engine 10 is a condition that the temperature of the three-way catalyst converter 116 is higher than a threshold and thus warm-up is completed. It should be noted that the temperature of the three-way catalyst converter 116 may be directly detected using a sensor, or may be estimated on the basis of an exhaust gas temperature or the intake air amount Qi.

The condition regarding the speed of the vehicle 1 is a condition that the speed V of the vehicle 1 is lower than a threshold V(0) for preventing the first MG 20 from rotating at an excessively high speed. The condition regarding the presence/absence of a request to operate the air conditioner is, for example, a condition that there is no request to operate a heater.

Each of the thresholds used for the aforementioned respective conditions is set to ensure an electric power that allows the vehicle 1 to run only by the second MG 30 (which will be referred to hereinafter also as EV running) and an electric power that allows the engine 10 to be started using the first MG 20, or to restrain the deterioration in the battery 70 from being promoted.

It should be noted that the aforementioned conditions are examples, and that the automatic stop permission condition is not limited to the aforementioned conditions. The automatic stop permission condition may include conditions other than the aforementioned conditions.

The ECU 200 permits automatic stop control when the aforementioned automatic stop condition is fulfilled. That is, the ECU 200 stops the engine 10 when the engine 10 is in operation. For example, the ECU 200 stops the injection of fuel to the engine 10 to stop the operation of the engine 10. The ECU 200 keeps the engine 10 stopped when the engine 10 is stopped.

On the other hand, the ECU 200 prohibits automatic stop control when the aforementioned automatic stop condition is not fulfilled. That is, when the engine 10 is in operation, the ECU 200 keeps the engine 10 in operation, and refrains from stopping the engine 10. When the engine 10 has been stopped, the ECU 200 starts the engine 10. For example, the ECU 200 cranks the engine 10 using the first MG 20, and performs opening degree control for the throttle valve 110, fuel injection control, and ignition control to operate the engine 10.

While the engine 10 has been stopped due to the performance of automatic stop control, the temperature in the intake passage 106 of the engine 10 may rise. In particular, when the hot wire airflow meter 164 is provided in the intake passage 106, an energization state may be maintained during the stop of the engine 10. Thus, the temperature around the intake air temperature sensor 162 may rise during the stop of the engine 10. As a result, when the engine 10 is restarted, a difference may arise between a detection value of the intake air temperature sensor 162 and an actual intake air temperature, and the control accuracy in performing the control of the engine 10 (e.g., fuel injection control) based on the detection value of the intake air temperature sensor 162 may deteriorate.

Thus, in this embodiment of the invention, when a stop period Ts of the engine 10 according to automatic stop control is equal to or longer than a first period Ts(0), the output shaft 18 of the engine 10 is rotated using the first MG 20.

Further, the ECU 200 determines the first period Ts(0) in association with a detection value of the intake air temperature Ti detected by the intake air temperature sensor 162 provided in the intake passage 106 of the engine 10. More specifically, the ECU 200 determines the first period Ts(0) in a manner such that when the degree of rise in the detection value of the intake air temperature Ti detected by the intake air temperature sensor 162 is large, the first period Ts(0) is shorter than when the degree of rise in the detection value of the intake air temperature Ti detected by the intake air temperature sensor 162 is small.

Furthermore, when the output shaft 18 is not able to be caused to rotate using the first MG 20, the ECU 200 performs fuel injection control on the basis of the coolant temperature Tw at the time of restart of the engine 10. At this time, the ECU 200 refrains from detecting a failure in the intake air temperature sensor 162.

In this embodiment of the invention, the ECU 200 regards a case where the SOC of the battery 70 is smaller than a threshold SOC(1) as a case where the output shaft 18 is not able to be caused to rotate using the first MG 20, and performs fuel injection control on the basis of the coolant temperature Tw at the time of restart of the engine 10.

On the other hand, when the output shaft 18 is able to be caused to rotate using the first MG 20, the ECU 200 performs fuel injection control on the basis of the intake air temperature Ti of the engine 10 at the time of restart.

Figure 2:
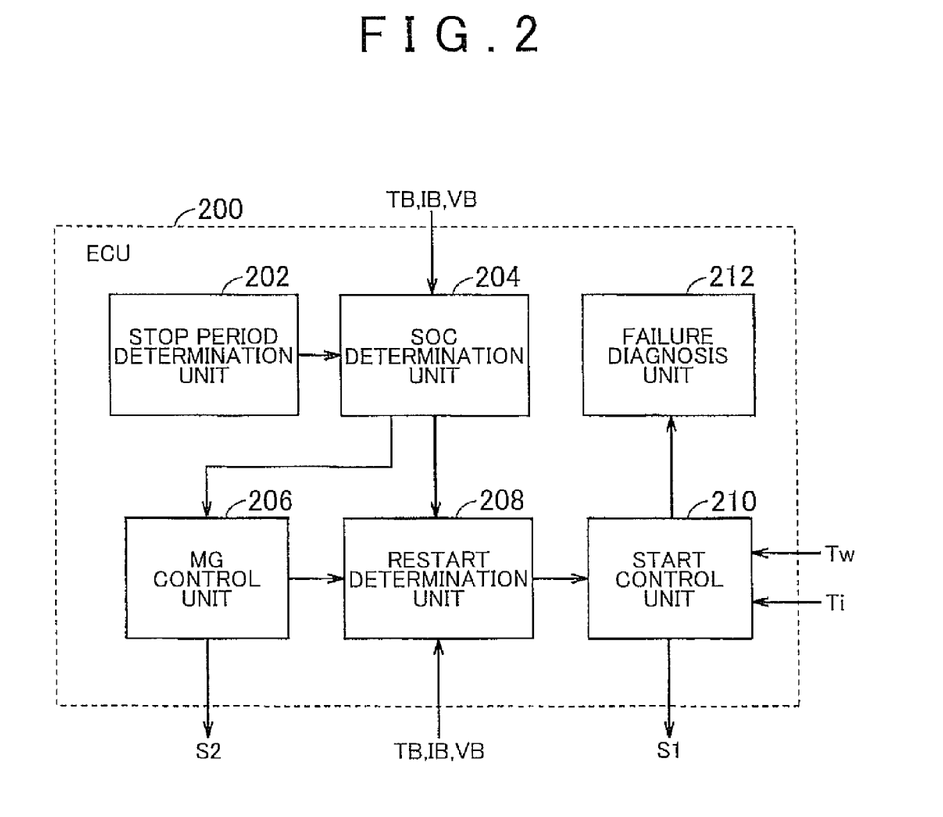
FIG. 2 is a functional block diagram of an ECU that is mounted in the hybrid vehicle according to the embodiment of the invention.

FIG. 2 shows a functional block diagram of the ECU 200 mounted in the vehicle 1 according to this embodiment of the invention. The ECU 200 includes a stop period determination unit 202, an SOC determination unit 204, an MG control unit 206, a restart determination unit 208, a start control unit 210, and a failure diagnosis unit 212.

The stop period determination unit 202 determines whether or not the stop period Ts from a time when the engine 10 is stopped through the performance of automatic stop control is equal to or longer than the first period Ts(0). It should be noted that the stop period Ts starts, for example, when the engine 10 is stopped from rotating (i.e., when the rotational speed of the engine 10 becomes substantially equal to zero), but may not necessarily start at such a time in particular. For example, the stop period Ts may start when fuel injection is stopped, or when the automatic stop permission condition is fulfilled.

For example, the stop period determination unit 202 determines the first period Ts(0) in association with a rise in the detection value of the intake air temperature Ti detected by the intake air temperature sensor 162. More specifically, the stop period determination unit 202 may determine the first period Ts(0) in a manner such that when an amount of rise ΔTi in the detection value of the intake air temperature Ti detected by the intake air temperature sensor 162 is large, the first period Ts(0) is shorter than when the amount of rise ΔTi in the detection value of the intake air temperature Ti detected by the intake air temperature sensor 162 is small. The first period Ts(0) may be a predetermined period. Further, for example, the stop period determination unit 202 may determine the first period Ts(0) in a manner such that when the detection value of the intake air temperature Ti detected by the intake air temperature sensor 162 is large, the first period Ts(0) is shorter than when the detection value of the intake air temperature Ti detected by the intake air temperature sensor 162 is small. The first period Ts(0) is longer than a period from a time when the engine 10 is stopped to a time when the temperature in the vicinity of the airflow meter 164 starts rising through energization, and is, for example, about 5 minutes.

It should be noted that the stop period determination unit 202 may turn a stop period determination flag on, for example, when the stop period Ts is equal to or longer than the first period Ts(0).

When the stop period determination unit 202 determines that the stop period Ts is equal to or longer than the first period Ts(0), the SOC determination unit 204 determines whether or not the SOC of the battery 70 is equal to or larger than a threshold SOC (1). The threshold SOC (1) is set such that the SOC of the battery 70 does not become smaller than a predetermined lower limit SOC(2) even when the engine 10 is operated using the first MG 20 while maintaining a rotational speed Ne(0) until the lapse of a predetermined time Tc (a second period Tc that will be described later). It should be noted that the predetermined time Tc and the rotational speed Ne(0) will be described later. The threshold SOC(1) may be a predetermined value.

Alternatively, the threshold SOC(1) may be set on the basis of the battery temperature TB. For example, the threshold SOC(1) may be determined in a manner such that when the battery temperature TB is high, the threshold SOC(1) is smaller than when the battery temperature TB is low.

Further, the threshold SOC(1) may be set on the basis of the coolant temperature Tw. For example, the threshold SOC (1) may be determined in a manner such that when the coolant temperature Tw is low, the threshold SOC (1) is larger than when the coolant temperature Tw is high. This is because when the coolant temperature Tw is low, the amount of friction in the engine 10 is larger than when the coolant temperature Tw is high.

It should be noted that the SOC determination unit 204 may, for example, determine whether or not the SOC of the battery 70 is equal to or larger than the threshold SOC(1) when the stop period determination flag is on, and turn an SOC determination flag on when the SOC of the battery 70 is equal to or larger than the threshold SOC(1).

When the SOC determination unit 204 determines that the SOC of the battery 70 is equal to or larger than the threshold SOC(1), the MG control unit 206 causes the output shaft of the engine 10 to rotate using the first MG 20 so that the air in the intake passage 106 flows. The MG control unit 206 generates a control signal S2 for causing the first MG 20 to rotate, and transmits the control signal S2 to the PCU 60. In the following description, the control of causing the output shaft (the crankshaft) of the engine 10 to rotate using the first MG 20 will be referred to also as cranking control.

The MG control unit 206 performs cranking control, for example, so that the engine rotational speed Ne becomes equal to the rotational speed Ne(0). The rotational speed Ne(0) is preferably a rotational speed at which at least the air in the intake passage 106 flows. Furthermore, the rotational speed Ne(0) is preferably set so as to avoid a rotational speed range in which the vehicle 1 vibrates due to resonance. It should be noted that the rotational speed Ne(0) may be a predetermined rotational speed, or may be determined on the basis of the detection value of the intake air temperature sensor 162. For example, the rotational speed Ne(0) may be determined in a manner such that when the detection value of the intake air temperature sensor 162 is high, the rotational speed Ne(0) is higher than when the detection value of the intake air temperature sensor 162 is low. The rotational speed Ne(0) may be regarded as "first rotational speed" according to the invention.

The MG control unit 206 ends cranking control when the second period Tc has elapsed after the start of cranking control, or when the engine 10 is restarted before the second period Tc elapses after the start of cranking control. It should be noted that the MG control unit 206 may reset the stop period Ts to an initial value (zero), for example, when cranking control is ended. Furthermore, the second period Tc may be a predetermined period, or may be determined in accordance with the SOC of the battery 70. For example, the second period Tc may be determined in a manner such that when the SOC is small, the second period Tc is shorter than when the SOC is large.

Furthermore, in this embodiment of the invention, the MG control unit 206 ends cranking control when the second period Tc has elapsed after the start of cranking control. In addition or instead, however, the MG control unit 206 may end cranking control when the detection value of the intake air temperature sensor 162 is lower than a predetermined value, or when the difference between the detection value of the intake air temperature sensor 162 and an outside air temperature is smaller than a predetermined value.

Further, the MG control unit 206 may perform cranking control, for example, when the SOC determination flag is on. Further, the opening degree of the throttle valve 110 is preferably set to be equal to a lower limit when cranking control is performed. In this manner, the flow velocity of air in the intake passage 106 can be increased.

The restart determination unit 208 determines whether or not the engine 10 is to be restarted. More specifically, the restart determination unit 208 determines that the engine 10 is to be restarted, when the aforementioned automatic stop permission condition is not fulfilled.

It should be noted that the restart determination unit 208 may turn a restart determination flag on, for example, upon determining that the engine 10 is to be restarted.

In the case where the MG control unit 206 causes the output shaft (crankshaft) of the engine 10 to rotate using the first MG 20 or in the case where the control of the first MG 20 has ended, the start control unit 210 performs first start control when the restart determination unit 208 determines that the engine 10 is to be restarted.

After the rotational speed of the crankshaft of the engine 10 has been raised to an engine rotational speed Ne(1) at which initial combustion is able to be performed, the start control unit 210 performs the control of performing opening degree control for the throttle valve 110, fuel injection control based on the intake air temperature Ti, and ignition control, as first start control. It should be noted that the rotational speed Ne(0) and the rotational speed Ne(1) may be equal to each other, or different from each other.

In performing fuel injection control based on the intake air temperature Ti, the start control unit 210 determines a basic injection time on the basis of, for example, the intake air amount Qi and the engine rotational speed Ne. The start control unit 210 determines a first correction injection time on the basis of the intake air temperature Ti. It should be noted that the start control unit 210 determines a second correction injection time corresponding to a state of the engine 10 other than the intake air temperature Ti. The start control unit 210 determines a final injection time (a fuel injection amount) by adding the first correction injection time and the second correction injection time to the determined basic injection time. It should be noted that since the density of air increases as the intake air temperature Ti falls, the start control unit 210 determines the first correction injection time in a manner such that when the intake air temperature Ti is low, the first correction injection time is longer than when the intake air temperature Ti is high. The second correction injection time includes a correction injection time based on a warm-up state of the engine 10 (the coolant temperature Tw).

Further, in the case where the SOC determination unit 204 determines that the SOC is smaller than the threshold SOC (1), the start control unit 210 performs second start control when the restart determination unit 208 determines that the engine 10 is to be restarted.

After the rotational speed of the crankshaft of the engine 10 has been raised to a rotational speed at which initial combustion is able to be performed using the first MG 20, the start control unit 210 performs the control of performing opening degree control for the throttle valve, fuel injection control based on the coolant temperature Tw, and ignition control, as second start control.

In performing fuel injection control based on the coolant temperature Tw, the start control unit 210 determines the aforementioned first correction injection time on the basis of the coolant temperature Tw. That is, the start control unit 210 estimates the intake air temperature Ti on the basis of the coolant temperature. Tw. The start control unit 210 estimates the intake air temperature Ti from, for example, the coolant temperature Tw and a predetermined map showing a relationship between the coolant temperature Tw and the intake air temperature Ti. The start control unit 210 determines the first correction injection time on the basis of the estimated intake air temperature Ti. Alternatively, the start control unit 210 may determine the first correction injection time from the coolant temperature Tw, and a predetermined map showing a relationship between the coolant temperature Tw and the first correction injection time. Fuel injection control based on this coolant temperature Tw may be performed, for example, until a system of the vehicle 1 is stopped (until an ignition off operation is performed by the start switch 150).

It should be noted that the start control unit 210 stops cranking by the first MG 20 when the rotational speed of the engine 10 is equal to or higher than a threshold Ne(2) used for determining that the engine 10 has been started.

The failure diagnosis unit 212 carries out a diagnosis of a failure in the intake air temperature sensor 162 while the engine 10 is in operation after the performance of first start control. For example, when the amount of change in the detection value of the intake air temperature sensor 162 is smaller than a threshold $\Delta Ti(1)$ ($<\Delta Ti(0)$) in a situation where a change in the intake air temperature is expected to be equal to or larger than a predetermined amount $\Delta Ti(0)$, the failure diagnosis unit 212 determines that a failure has occurred in the intake air temperature sensor 162. The predetermined amount $\Delta Ti(0)$ is, for example, 5° C., and the threshold $\Delta Ti(1)$ is, for example, 1° C. When the failure diagnosis unit 212 determines that a failure has occurred in the intake air temperature sensor 162, the failure diagnosis unit 212 may notify a passenger of the vehicle 1 that a failure has occurred in the intake air temperature sensor 162. The failure diagnosis unit 212 may notify the passenger of the vehicle 1 that a failure has occurred in the intake air temperature sensor 162 by, for example, lighting up a warning lamp, displaying information on a display unit, providing acoustic notification, or the like.

On the other hand, when the engine 10 is in operation after the performance of second start control, the failure diagnosis unit 212 invalidates a diagnosis of a failure. That is, while the engine 10 is in operation after the performance of second start control, the failure diagnosis unit 212 refrains from detecting a failure in the intake air temperature sensor 162. For example, while the engine 10 is in operation after the performance of second start control, the failure diagnosis unit 212 may refrain from carrying out the aforementioned diagnosis of a failure, may determine that no failure has occurred in the intake air temperature sensor 162 when the amount of change in the detection value of the intake air temperature sensor 162 is smaller than the threshold $\Delta Ti(1)$ in a situation where the change in the intake air temperature sensor 162 is expected to be equal to or larger than the predetermined amount $\Delta Ti(0)$, or may restrain the control of the vehicle 1 associated with a diagnosis result from being performed even upon determining that a failure has occurred in the intake air temperature sensor 162. For example, upon determining that a failure has occurred in the intake air temperature sensor 162, the failure diagnosis unit 212 may restrain the notification from being provided to the passenger of the vehicle 1, or may restrain the control that is performed on the condition that a failure has occurred in the intake air temperature sensor 162 from being performed. It should be noted that the failure diagnosis unit 212 may, for example, invalidate a diagnosis of a failure until the system of the vehicle 1 is stopped (until the ignition off operation is performed by the start switch 150). Further, for example, in invalidating a diagnosis of a failure, the failure diagnosis unit 212 may turn an invalidation flag on.

In this embodiment of the invention, the stop period determination unit 202, the SOC determination unit 204, the MG control unit 206, the restart determination unit 208, the start control unit 210, and the failure diagnosis unit 212 are all realized through the execution of a program stored in a memory by a CPU of the ECU 200, and function as software. However, these units may be realized by hardware. It should be noted that such a program is stored on a storage medium, and that the storage medium is mounted in the vehicle 1.

Figure 3:
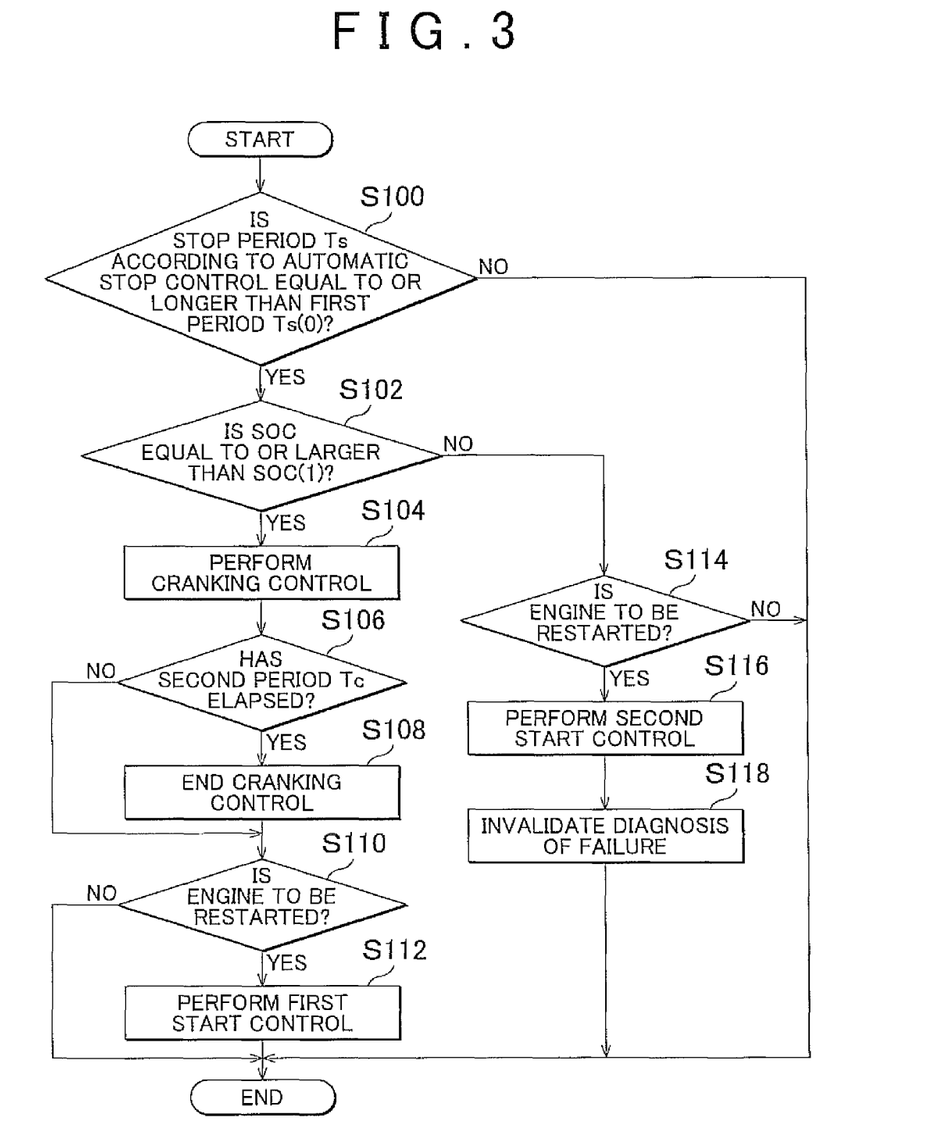
FIG. 3 is a flowchart showing a control structure of a program executed by the ECU that is mounted in the hybrid vehicle according to the embodiment of the invention.

The control structure of a program executed by the ECU 200 mounted in the vehicle 1 according to this embodiment of the invention will be described with reference to FIG. 3.

In step (hereinafter, step will be referred to as S) 100, the ECU 200 determines whether or not the stop period Ts of the engine 10 is equal to or longer than the first period Ts(0). If the stop period Ts of the engine 10 is equal to or longer than the first period Ts(0) (YES in S100), the processing is shifted to S102. If not (NO in S100), this processing ends.

In S102, the ECU 200 determines whether or not the SOC of the battery 70 is equal to or larger than the threshold SOC(1). If the SOC of the battery 70 is equal to or larger than the threshold SOC(1) (YES in S102), the processing is shifted to S104. If not (NO in S102), the processing is shifted to S114.

In S104, the ECU 200 performs cranking control using the first MG 20, so as to make the engine rotational speed Ne equal to the rotational speed Ne(0). In S106, the ECU 200 determines whether or not a predetermined time has elapsed after the start of cranking control. If the predetermined time has elapsed (YES in S106), the processing is shifted to S108. If not (NO in S106), the processing is shifted to S110.

In S110, the ECU 200 determines whether or not the engine 10 is to be restarted. If the engine 10 is to be restarted (YES in S110), the processing is shifted to S112. If not (NO in S110), this processing ends.

In S112, the ECU 200 performs first start control. It should be noted that since first start control has been described above, the detailed description thereof will not be repeated.

In S114, the ECU 200 determines whether or not the engine 10 is to be restarted. If the engine 10 is to be restarted (YES in S114), the processing is shifted to S116. If not (NO in S114), this processing ends.

In S116, the ECU 200 performs second start control. It should be noted that since second start control has been described above, the detailed description thereof will not be repeated. In S118, the ECU 200 invalidates a diagnosis of a failure in the intake air temperature sensor 162.

The operation of the ECU 200 mounted in the vehicle 1 according to this embodiment of the invention, which is based on the structure and flowchart as described above, will be described with reference to FIG. 4.

Figure 4:
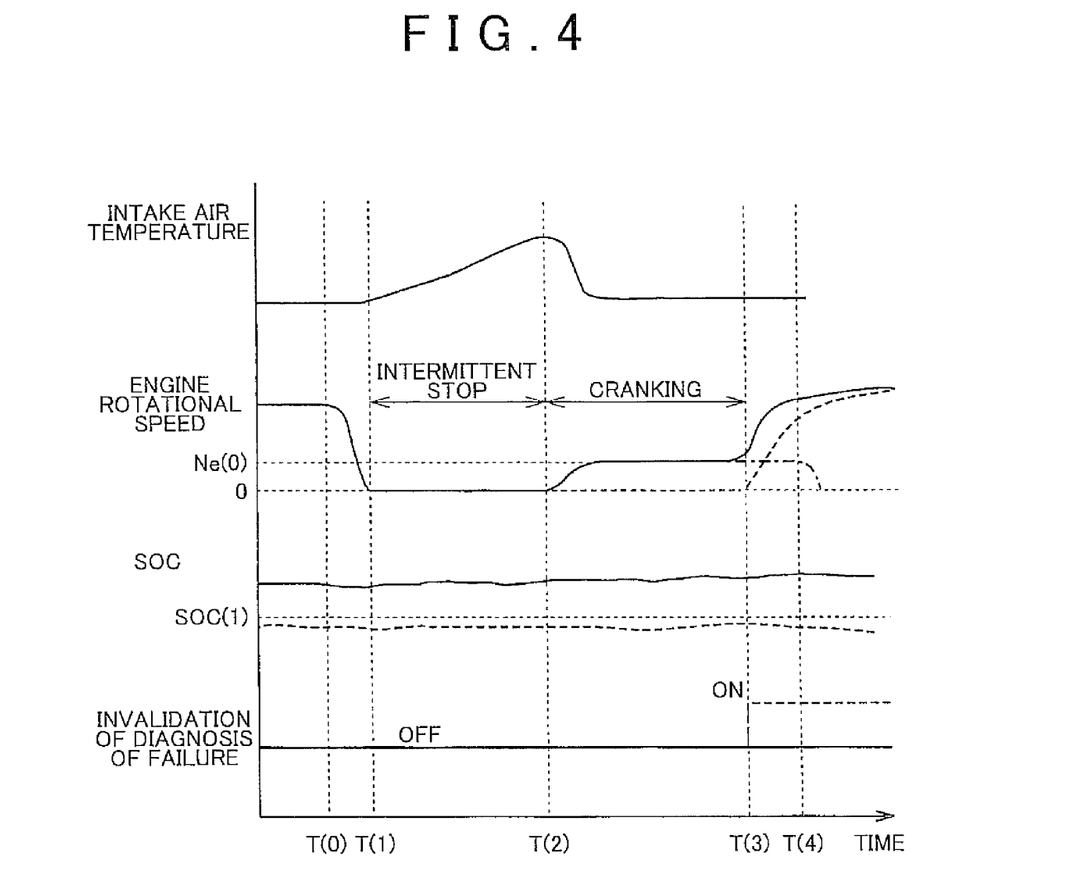
FIG. 4 is a timing chart showing the operation of the ECU that is mounted in the hybrid vehicle according to the embodiment of the invention.

As indicated by solid lines in FIG. 4, it is assumed, for example, that the engine 10 is in operation and the SOC of the battery 70 is larger than the threshold SOC(1).

If the automatic stop permission condition is fulfilled at a time T(0), the ECU 200 stops the engine 10 by, for example, stopping fuel injection. As soon as the engine rotational speed Ne becomes substantially equal to zero at a time T(1), the measurement of the stop period according to automatic stop control is started.

If the stop period Ts of the engine 10 becomes equal to or longer than the first period Ts(0) at a time T(2) (YES in S100), the SOC of the battery 70 is larger than the threshold SOC(1) (YES in S102), and therefore, cranking control is performed using the first MG 20 (S104). Thus, the engine rotational speed Ne rises to the rotational speed Ne(0).

Due to the performance of cranking control, pistons in the cylinders 102 of the engine 10 move upward and downward.

Due to the upward and downward movements of the pistons, the air in the intake passage 106 flows to the exhaust passage 114 side. Thus, the temperature around the intake air temperature sensor 162 falls.

If the automatic stop permission condition is not fulfilled at a time T(3) before a predetermined time Tc elapses after the start of the performance of cranking control (NO in S106), it is determined that the engine 10 is to be restarted (YES in S110). Thus, first start control is performed (S112). At this time, a diagnosis of a failure in the intake air temperature sensor 162 is carried out.

Further, if the predetermined time Tc has elapsed after the start of the performance of cranking control (YES in S106), cranking control ends at a time T(4) as indicated by an alternate long and short dash line in FIG. 4 (S108).

Next, as indicated by a broken line in FIG. 4, it is assumed that the engine 10 is in operation and the SOC of the battery 70 is smaller than the threshold SOC(1).

If the automatic stop permission condition is fulfilled at the time T(0), the ECU 200 stops the engine 10 by, for example, stopping fuel injection. As soon as the engine rotational speed Ne becomes substantially equal to zero at the time T(1), the measurement of the stop period Ts according to automatic stop control is started.

Even if the stop period Ts of the engine 10 becomes equal to or longer than the first period Ts(0) at the time T(2) (YES in S100), the SOC of the battery 70 is smaller than the threshold SOC(1) (NO in S102), and therefore, cranking control is not performed.

If the automatic stop permission condition is not fulfilled at the time T(3), it is determined that the engine 10 is to be restarted (YES in S114). Thus, second start control is performed (S116). At this time, a diagnosis of a failure in the intake air temperature sensor 162 is invalidated (S118).

In the manner as described above, in the vehicle according to this embodiment of the invention, it is possible to cause the air in the intake passage 106 of the engine 10 to flow, by performing cranking control using the first MG 20 when the stop period Ts of the engine 10 according to automatic stop control is equal to or longer than the first period Ts(0). Thus, air is restrained from stagnating around the intake air temperature sensor 162. That is, the temperature around the intake air temperature sensor 162 is restrained from rising. As a result, the discrepancy between the detection value of the intake air temperature sensor 162 and the actual intake air temperature is restrained from being increased when the engine 10 is restarted. Accordingly, it is possible to provide the hybrid vehicle in which the accuracy in controlling the internal combustion engine is restrained from deteriorating at the time of restart thereof, and a method of controlling the hybrid vehicle.

Furthermore, when the output shaft (crankshaft) is not able to be caused to rotate using the first MG 20, namely, when the SOC of the battery 70 is smaller than the threshold SOC(1), the control accuracy is restrained from deteriorating by performing fuel injection control on the basis of the coolant temperature Tw instead of performing cranking control, as compared to when fuel injection control is performed on the basis of the detection value of the intake air temperature sensor.

Furthermore, it is possible to restrain erroneous detection of a failure in the intake air temperature sensor 162, by performing fuel injection control based on the coolant temperature Tw and invalidating a diagnosis of a failure in the intake air temperature sensor 162. Further, the engine 10 is appropriately controlled without separately providing a circuit or a dedicated power supply that interrupts the energization of the hot wire of the airflow meter during the stop of the engine 10, by performing the control as described above. Thus, the cost is restrained from rising.

It should be noted that although the first period is determined in a manner such that when the amount of rise ΔTi in the detection value of the intake air temperature Ti detected by the intake air temperature sensor 162 is large, the first period is shorter than when the amount of rise ΔTi in the detection value of the intake air temperature Ti detected by the intake air temperature sensor 162 is small in this embodiment of the invention, the first period may be determined, for example, in a manner such that when the detection value of the intake air temperature Ti detected by the intake air temperature sensor 162 is high, the first period is shorter than when the detection value of the intake air temperature Ti detected by the intake air temperature sensor 162 is low. Alternatively, the first period may be determined in a manner such that when the coolant temperature Tw is high, the first period is shorter than when the coolant temperature Tw is low.

Further, a hybrid vehicle that can be charged by the external power supply 302 may continue to run for a long time using the second MG 30 with the engine stopped, when running after having been charged. That is, the stop period of the engine 10 according to automatic stop control may last long. Therefore, the accuracy in controlling the internal combustion engine at the time of restart thereof is more effectively restrained from deteriorating, by applying the invention to such a vehicle. It should be noted that although the vehicle 1 includes a charging device 78 and can be charged by the external power supply 302 in this embodiment of the invention, the invention is also applicable to a vehicle that is not mounted with the charging device 78.

Further, although the vehicle 1 having front wheels as the driving wheels 80 is shown as an example in FIG. 1, the invention is not limited to such a drive system in particular. For example, the vehicle 1 may have rear wheels as driving wheels. Alternatively, the vehicle 1 may be a vehicle in which the second MG 30 in FIG. 1 is coupled to a drive shaft for driving the rear wheels instead of being coupled to the drive shaft 16 for the front wheels. Further, a transmission may be provided between the drive shaft 16 and the reducer 58, or between the drive shaft 16 and the second MG 30.

Figure 5:
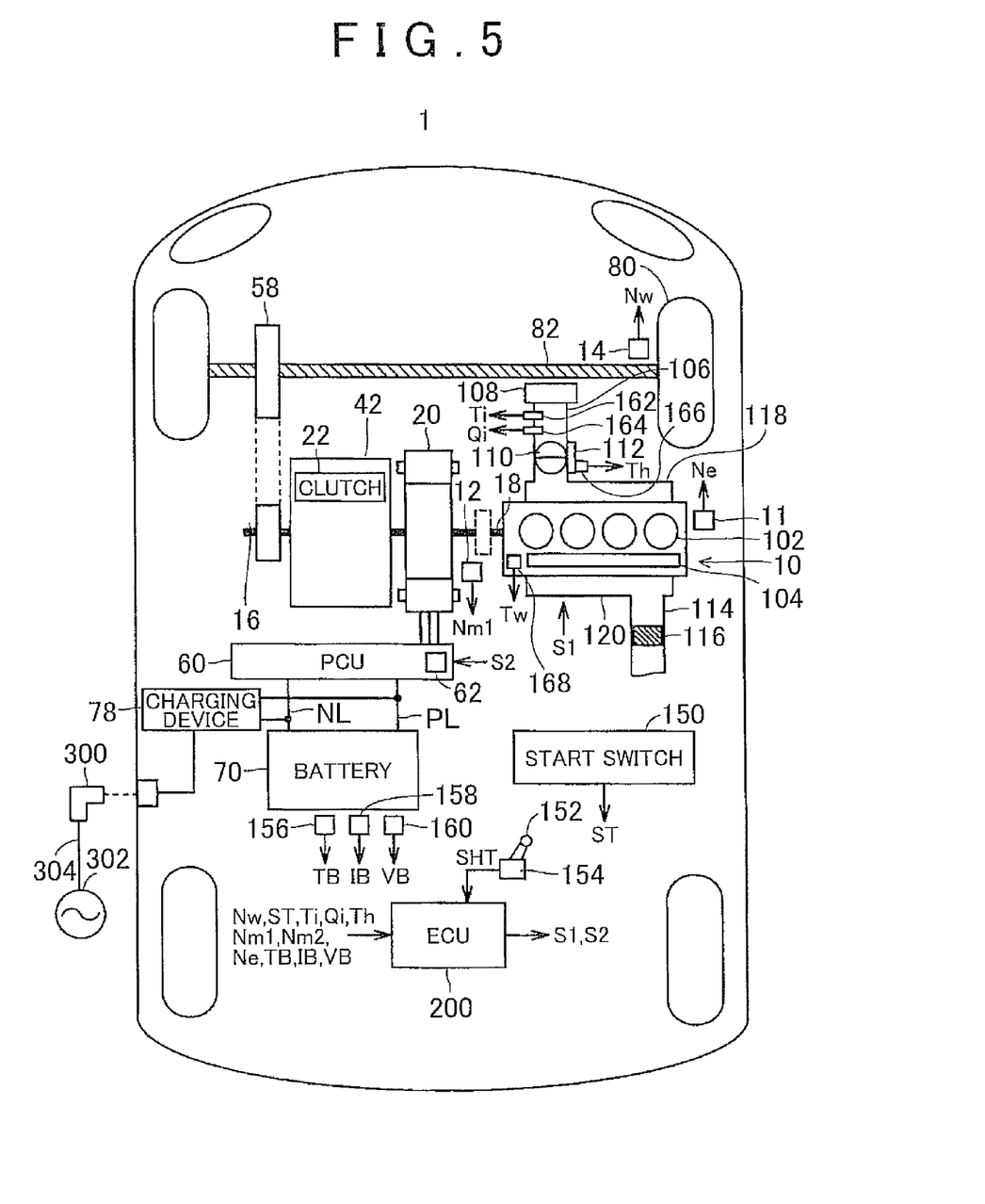
FIG. 5 is a view showing an example of the configuration of a hybrid vehicle according to another embodiment of the invention.

Alternatively, the vehicle 1 may have a configuration as shown in FIG. 5. More specifically, the vehicle 1 shown in FIG. 5 is different in configuration from the vehicle 1 shown in FIG. 1 in that the vehicle 1 does not have the second MG 30, that the rotary shaft of the first MG 20 is directly coupled to the output shaft 18 of the engine 10, and that the vehicle 1 includes a power transmission device 42 having a clutch 22 instead of including the power split device 40. The clutch 22 changes the state of the first MG 20 and the driving wheels 80 between a power transmission state and a power shutoff state. The power transmission device 42 is, for example, a transmission. It should be noted that another clutch (indicated by a broken line in FIG. 5) may further be provided between the engine 10 and the first MG 20, in addition to the clutch 22.

Furthermore, in this embodiment of the invention, when the stop period Ts is equal to or longer than the first period Ts(0) and the SOC of the battery 70 is equal to or larger than the threshold SOC(1), the ECU 200 performs cranking control using the first MG 20. However, the condition of performing cranking control using the first MG 20 is not limited to the foregoing condition.

For example, the ECU 200 may perform cranking control using the first MG 20 in a case where the shift position is different from the P position, in addition to or instead of a case where the stop period Ts is equal to or longer than the first period Ts(0) and the SOC of the battery 70 is equal to or larger than the threshold SOC(1). That is, the ECU 200 may regard a case where the shift position is the P position as a case where the output shaft 18 is not able to be caused to rotate using the first MG 20, and may perform fuel injection control on the basis of the coolant temperature Tw when the engine 10 is restarted.

Figure 6:
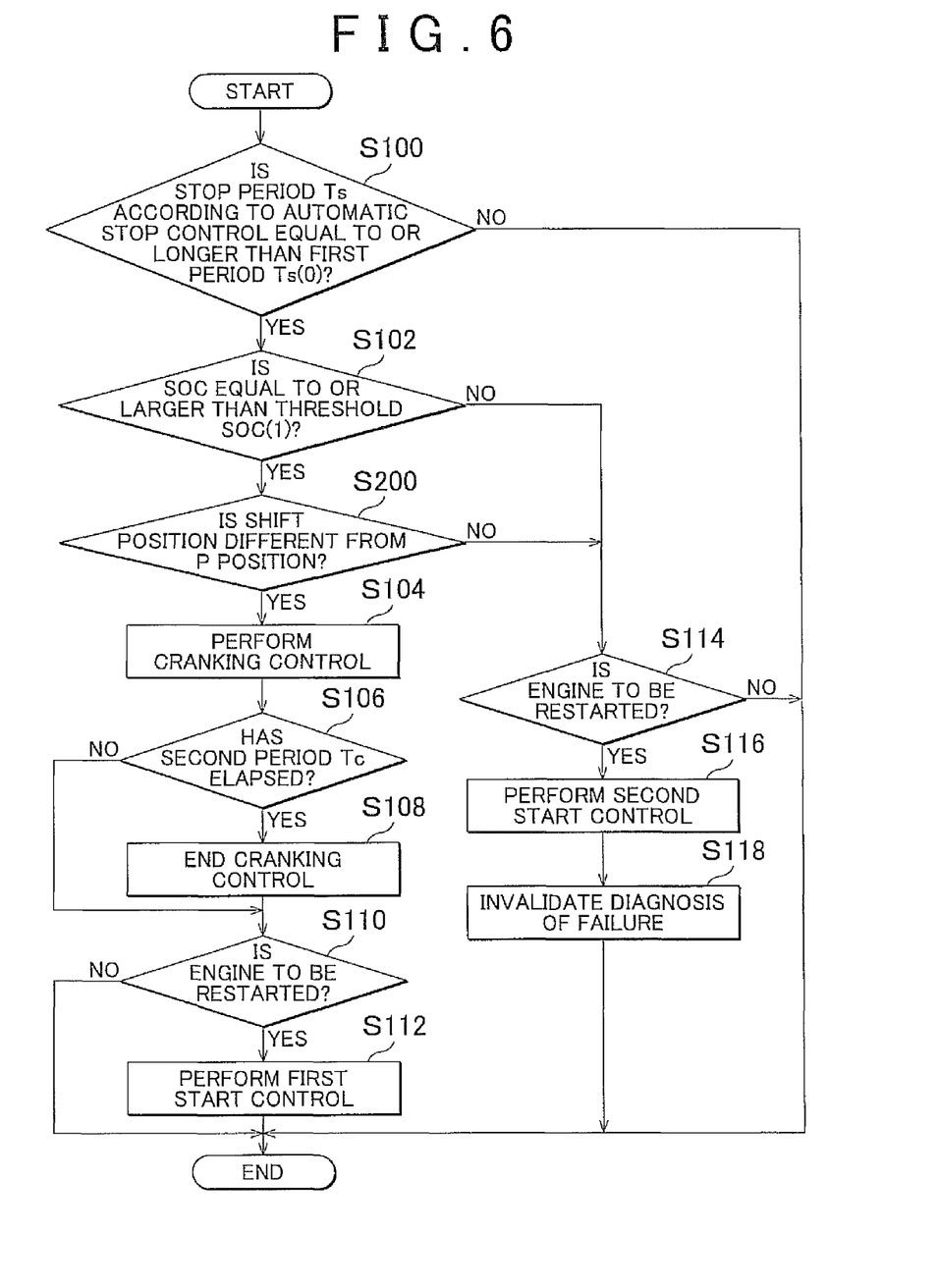
FIG. 6 is a view showing another example of a flowchart showing a control structure of a program executed by an ECU.

For example, the ECU 200 may execute a program based on a flowchart shown in FIG. 6. It should be noted that those processes in the flowchart shown in FIG. 6 which are the same as in the flowchart shown above in FIG. 3 are denoted by the same step numbers respectively. The processes denoted by the same step number are identical to each other as well. Accordingly, the detailed description of those processes will not be repeated herein.

In the flowchart shown in FIG. 6, if it is determined that the SOC of the battery 70 is equal to or larger than the threshold SOC(I) (YES in S102), the ECU 200 determines in S200 whether or not the shift position is different from the P position. If the shift position is different from the P position (YES in S200), the processing is shifted to S104. If not (NO in S200), the processing is shifted to S114.

If cranking control is performed using the first MG when the P position is selected, the engine 10 is cranked during the stop of the vehicle 1. As a result, the driver may recognize vibrations of the vehicle 1 caused by cranking. Thus, vibrations of the vehicle 1 caused by cranking control can be restrained from being recognized by the driver, by carrying out cranking when the shift position is different from the P position.

The example embodiments of the invention that have been disclosed in the specification are to be considered in all respects as illustrative and not restrictive. The technical scope of the invention is defined by claims, and all changes which come within the meaning and range of equivalency of the claims are therefore intended to be embraced therein.

What is claimed is:

1. A hybrid vehicle comprising:
   an internal combustion engine;
   a rotating electrical machine that rotates an output shaft of the internal combustion engine;
   an intake air temperature detection unit that is provided in an intake passage of the internal combustion engine; and
   a control unit that performs automatic stop control for the internal combustion engine, wherein
   the control unit causes the output shaft to rotate using the rotating electrical machine, when a stop period of the internal combustion engine according to the automatic stop control is equal to or longer than a first period, and wherein
   the control unit determines the first period in association with a detection value detected by the intake air temperature detection unit.

2. The hybrid vehicle according to claim 1, wherein the control unit determines the first period in a manner such that the first period increases relative to a decrease in the change of the detection value.

3. The hybrid vehicle according to claim 1, wherein the control unit determines the first period in a manner such that the first period increases relative to a decrease in the detection value.

4. The hybrid vehicle according to claim 1, wherein the control unit determines the first period in a manner such that the first period increases relative to a decrease in a temperature of a cooling medium for the internal combustion engine.

5. The hybrid vehicle according to claim 1, wherein the control unit determines a first rotational speed in a manner such that the first rotational speed increases relative to a decreasing detection value, and the control unit causes the output shaft to rotate using the rotating electrical machine so that a rotational speed of the internal combustion engine becomes equal to the first rotational speed.

6. The hybrid vehicle according to claim 1, wherein the control unit performs fuel injection control on the basis of a temperature of a cooling medium for the internal combustion engine at a time of restart of the internal combustion engine, when the output shaft is not able to be caused to rotate using the rotating electrical machine.

7. The hybrid vehicle according to claim 6, further comprising an electric storage device that supplies an electric power to the rotating electrical machine, wherein the control unit regards a case where a remaining capacity of the electric storage device is smaller than a threshold as a case where the output shaft is not able to be caused to rotate using the rotating electrical machine, and performs the fuel injection control on the basis of the temperature of the cooling medium at the time of the restart.

8. The hybrid vehicle according to claim 7, wherein the control unit determines the threshold based on a temperature of the electric storage device.

9. The hybrid vehicle according to claim 7, wherein the control unit determines the threshold based on the temperature of the cooling medium.

10. The hybrid vehicle according to claim 6, wherein the control unit regards a case where a shift position is a parking position as a case where the output shaft is not able to be caused to rotate using the rotating electrical machine, and performs the fuel injection control on the basis of the temperature of the cooling medium at the time of the restart.

11. The hybrid vehicle according to claim 6, further comprising an intake air temperature detection unit that is provided in an intake passage of the internal combustion engine, wherein the control unit refrains from detecting a failure in the intake air temperature detection unit when the fuel injection control is performed on the basis of the temperature of the cooling medium for the internal combustion engine at the time of the restart.

12. The hybrid vehicle according to claim 6, further comprising an intake air temperature detection unit that is provided in an intake passage of the internal combustion engine, wherein the control unit performs the fuel injection control on the basis of a detection value detected by the intake air temperature detection unit at the time of the restart, when the output shaft is able to be caused to rotate using the electrical rotating machine.

13. The hybrid vehicle according to claim 1, further comprising a hot wire airflow meter that is provided in the intake passage of the internal combustion engine, and that detects a flow rate of air in the intake passage, wherein:
   the hot wire airflow meter is held energized while the internal combustion engine has been stopped through the automatic stop control; and
   the control unit causes the output shaft to rotate using the rotating electrical machine so that air in the intake passage flows, when the stop period of the internal combustion engine according to the automatic stop control is equal to or longer than the first period.

14. A method of controlling a hybrid vehicle including an internal combustion engine and a rotating electrical machine that rotates an output shaft of the internal combustion engine, comprising:
   performing automatic stop control for the internal combustion engine; and causing the output shaft to rotate using the rotating electrical machine when a stop period of the internal combustion engine according to the automatic stop control is equal to or longer than a first period, wherein the first period is calculated in association with a detection value, the detection value detected by an intake air temperature detection unit that is provided in an intake passage of the internal combustion engine.

* * * * *